US006988290B2

(12) United States Patent
Enoch, III et al.

(10) Patent No.: US 6,988,290 B2
(45) Date of Patent: Jan. 24, 2006

(54) REMOTELY ACTUATED SURFACE CLEANING DEVICE

(75) Inventors: Duard W. Enoch, III, 429 Pacific Oaks Rd., Goleta, CA (US) 93117; Harry Linden, Santa Barbara, CA (US)

(73) Assignee: Duard W. Enoch, III, Goleta, CA (US)

( * ) Notice: Subject to any disclaimer, the term of this patent is extended or adjusted under 35 U.S.C. 154(b) by 0 days.

(21) Appl. No.: 10/779,367

(22) Filed: Feb. 12, 2004

(65) Prior Publication Data

US 2004/0216253 A1    Nov. 4, 2004

Related U.S. Application Data

(60) Provisional application No. 60/449,277, filed on Feb. 20, 2003.

(51) Int. Cl.
*A47L 1/03* (2006.01)
(52) U.S. Cl. .............................. 15/103; 15/22.2; 15/28; 15/220.2
(58) Field of Classification Search ................. 15/22.1, 15/22.2, 28, 97.1, 103, 220.2
See application file for complete search history.

(56) References Cited

U.S. PATENT DOCUMENTS 3,983,591 A * 10/1976 Ohtaki et al. ................... 15/28

6,634,052 B2 * 10/2003 Hanson ....................... 15/220.2

FOREIGN PATENT DOCUMENTS

| DE | 3630324 | * | 10/1988 |
| JP | 9-224881 | * | 9/1997 |
| WO | 01/00077 | * | 1/2001 |

OTHER PUBLICATIONS

Derwent-Acc-No 2004-035881 related to CN 1448103 A, published Oct. 15, 2003.*
Derwent-Acc-No 1979-C1558B related to SU 603370 A, published Mar. 29, 1978.*

* cited by examiner

*Primary Examiner*—Mark Spisich
(74) *Attorney, Agent, or Firm*—Felix L. Fischer

(57) ABSTRACT

A remotely actuated surface cleaning device employs an inner component having a resiliently flexible body with a plurality of embedded magnets and a cleaning element to engage a surface to be cleaned. An outer housing containing an electric motor moves a support disc containing an operably like plurality of magnets to those embedded in the body. The inner and outer components are placed oppositely adjacent on the surface to be cleaned thereby supporting the inner component with respect to the outer component by magnetic attraction. Operation of the motor moving the second support disc causes the sympathetic motion of the first support disc and body thereby rapidly moving the cleaning element across the surface to be cleaned.

19 Claims, 14 Drawing Sheets

REMOTELY ACTUATED SURFACE CLEANING DEVICE

REFERENCE TO RELATED APPLICATIONS

This application claims priority of U.S. Provisional application Ser. No. 60/449,277 filed on Feb. 20, 2003 entitled REMOTELY ACTUATED GLASS CLEANING DEVICE.

FIELD OF THE INVENTION

This invention relates generally to the field of surface cleaning devices and, more particularly, to a magnetically driven cleaning disc for a surface controlled, actuated and positioned by a drive unit located on the surface opposite from the surface being cleaned.

BACKGROUND OF THE INVENTION

Cleaning of glass surfaces which are difficult to access or have other limitations, such as aquarium interior surfaces, require specialized cleaning devices. In the aquarium art, for example, it is desirable to be able to clean the interior of the glass or clear plastic walls without draining the tank or reaching into the water. The currently available devices for cleaning the interior surface of the aquarium wall use two oppositely charged magnets carried in specially adapted housings.

The first magnet is positioned on the outside of the glass with the second magnet on the inside of the glass in the tank. The second magnet has a covering of a rough or abrasive substance as a cleaning surface to scrape off algae and other materials adhered to the glass. The outer magnet case has a smooth resilient surface to avoid scratching or marring the external surface of the glass. The magnets are positioned adjacent one another on the internal and external surfaces of the glass. The internal magnet is attracted to the external magnet. The external magnet is moved by hand over the glass with the internal magnet following the motion. This induced motion of the internal magnet moves the cleaning surface across the inner surface of the glass to clean the glass. An example of this type of device is disclosed in U.S. Pat. No. 6,348,104 entitled DEVICE AND METHOD FOR CLEANING AQUARIUM WINDOWS issued on Feb. 19, 2002 to Bakker.

The cleaning action of the devices described is inefficient and usually requires multiple passes over any significant algae growth to remove the deposits. In some cases the devices are ineffective in removing the deposits.

It is therefore desirable to have a remotely powered surface cleaning device capable of more vigorous cleaning action. It is further desirable to have a cleaning device with a reduced profile cleaning component for access to areas in which other objects are in close proximity to the glass-thereby limiting accessibility. It is also desirable to have a flexible inner component to conform to convex or concave glass surfaces.

SUMMARY OF THE INVENTION

A remotely actuated surface cleaning device employs an inner component having a resiliently flexible body with a plurality of embedded magnets. A cleaning element or surface on the inner component such as a reticulated surface or a plurality of brushes extending from the front face of the body engage a surface to be cleaned. An outer component incorporates a housing containing an electric motor having a drive axle for moving a support disc containing an operably like plurality of magnets to those embedded in the body. The support disc is mounted substantially perpendicular to the drive axle for motion in a plane parallel to the surface to be cleaned. The inner and outer components are placed oppositely adjacent on the surface to be cleaned thereby supporting the inner component with respect to the outer component by magnetic attraction. Operation of the motor moving the second support disc causes the sympathetic motion of the first support disc and body thereby rapidly moving the cleaning element across the surface to be cleaned.

BRIEF DESCRIPTION OF THE DRAWINGS

These and other features and advantages of the present invention will be better understood by reference to the following detailed description when considered in connection with the accompanying drawings wherein:

FIG. 1b is a front view of the inner cleaning component disclosed in FIG. 1a;

FIG. 1c is a back view of the inner cleaning component disclosed in FIG. 1a;

FIG. 2b is a front view of the outer actuation component disclosed in FIG. 2a;

DETAILED DESCRIPTION OF THE INVENTION

Figure 1A:
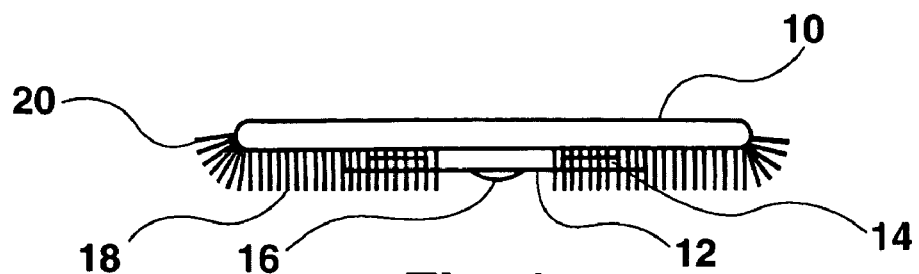
FIG. 1a is a side view of the inner component of a first embodiment of the present invention.
Figure 1B:
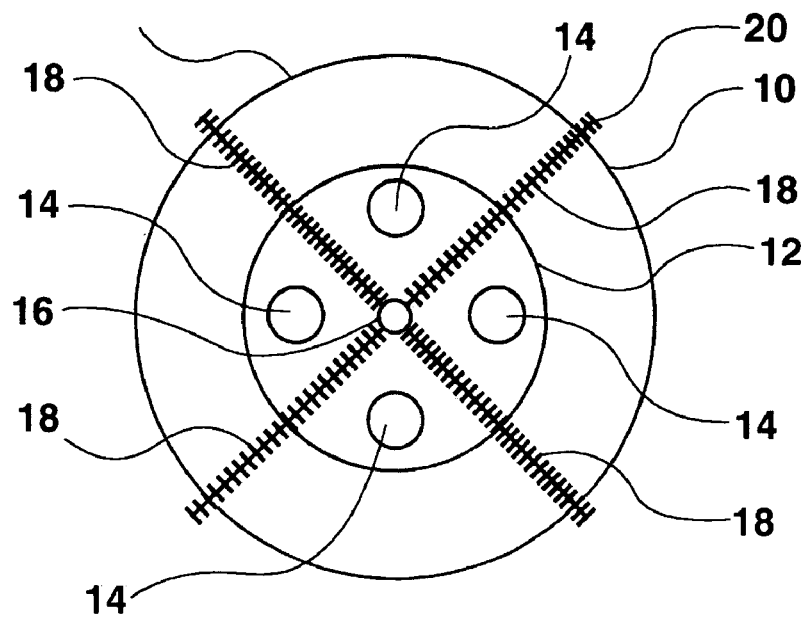
Figure 1C:
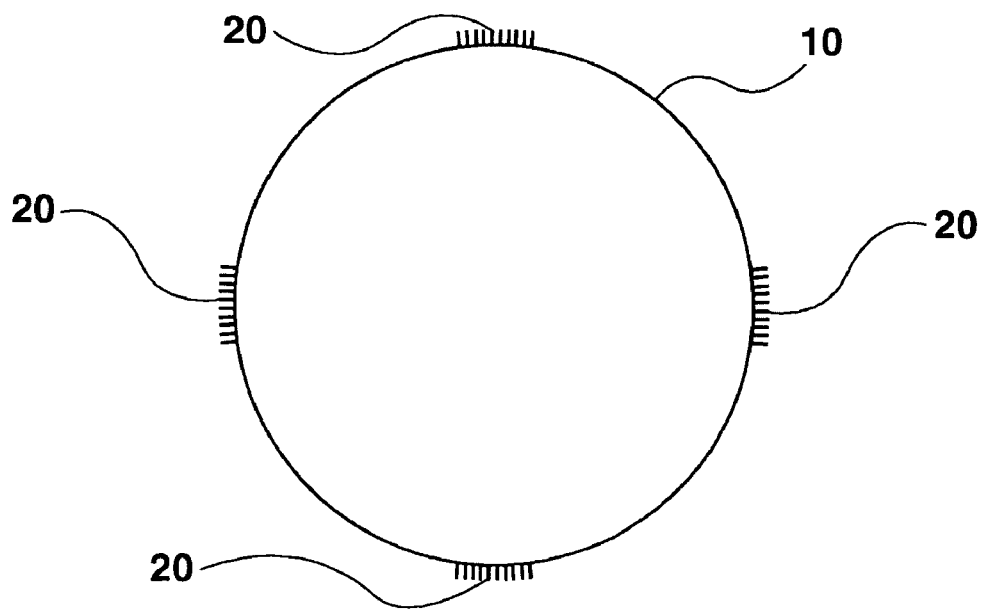

Referring to the drawings, FIGS. 1a, 1b and 1c show an embodiment of the cleaning or inner component of a device according to the present invention. A resiliently flexible body 10 carries a magnet support disc 12 which has multiple magnets 14 supported in the disc. A nub 16 protrudes from the support disc engaging the surface to be cleaned to act as a rotation point as will be described in greater detail subsequently. For the embodiments shown herein, the surface is a glass or plexiglass sheet such as the wall of an aquarium. To provide a cleaning element for this embodiment, multiple brushes 18 extend radially across the front surface of the body and support disc, for cleaning the glass surface. The brushes have a side portion 20 extending around the edge of the body to engage surfaces perpendicularly adjacent the glass surface.

For the embodiment shown, four magnets are embedded in the support disc which has a diameter of approximately half the body diameter. Four brushes are arranged to radially extend from the nub across the surface of the support disc and the body between the magnets. In alternative embodiments, brushes or pads covering a greater portion of the surface of the support disc and body are employed. In this embodiment, the inner component is substantially circular in planform having a diameter significantly greater that its thickness. While a separate support disc in which the magnets are embedded has been shown for this embodiment, a homogenous body with magnets directly embedded therein is employed in alternative embodiments, as will be described in greater detail subsequently.

Figure 2A:
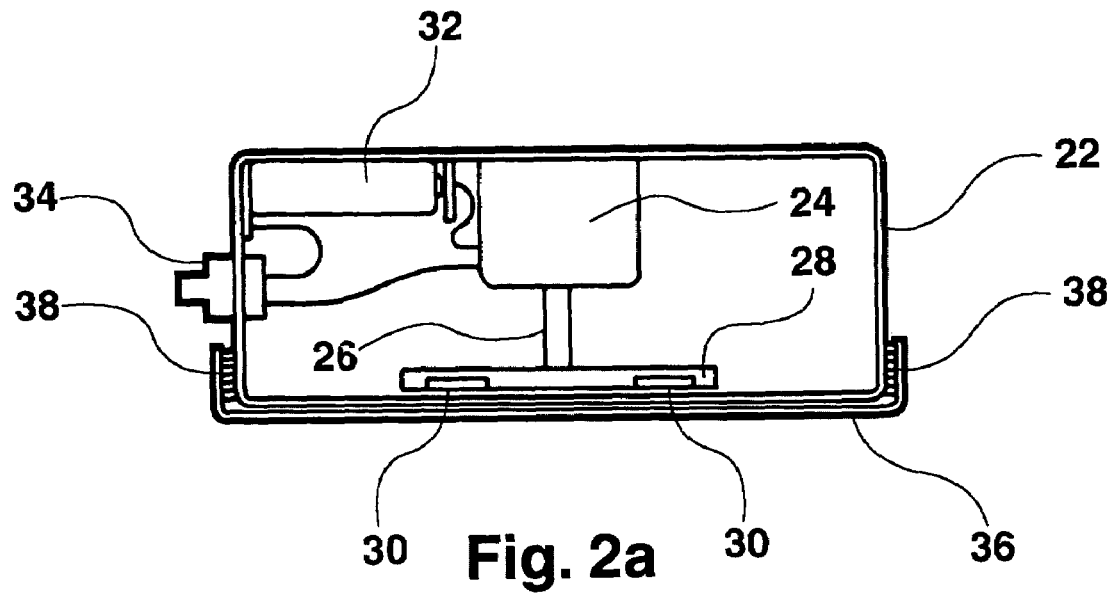
FIG. 2a is a side view of the outer actuation component of the present invention.
Figure 2B:
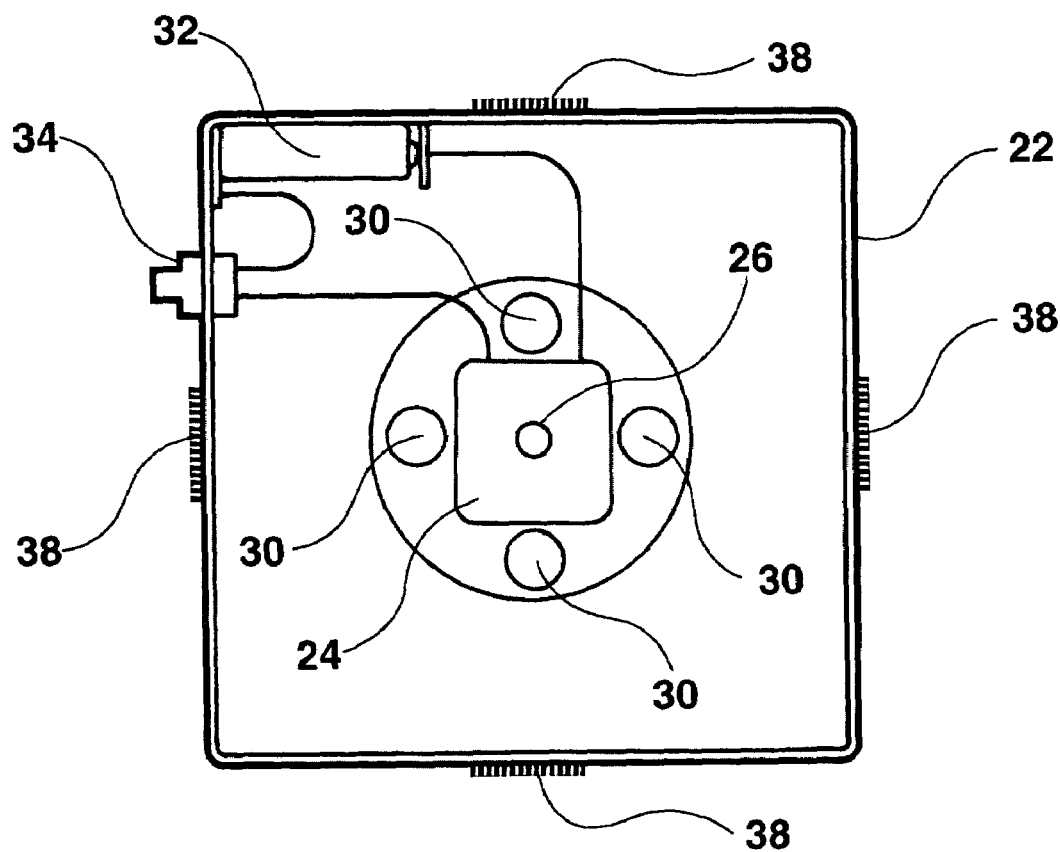

The actuating or outer component of the first embodiment of the present invention is shown in FIGS. 2a and 2b. A plastic housing 22 supports a DC electric motor 24 having a drive axle 26. A second magnet support disc 28 carrying multiple magnets 30 is attached substantially perpendicularly to the drive axle. In the embodiment shown, the motor is powered by a battery 32 with a switch 34 placed in a side of the housing for easy activation by the user. A spring loaded contact switch or comparable device is employed to activate the motor only when held down by the user to avoid unnecessary battery drain. Those skilled in the art will recognize that alternative applications, depending on the size of the cleaning device, an AC motor with cord attachment for a wall outlet can be employed or a light weight ultrasonic motor. Additionally, for sizing or mechanical efficiency, the motor and axle connection is accomplished in alternative embodiments through a gear train arrangement including, in certain embodiments, an angular offset of the motor and axle.

For the embodiment shown, a removable soft cloth covering 36 is attached to the face of the plastic housing to clean the outer surface of the glass and prevent marring. The covering is attached to the housing using Velcro strips 38. In certain embodiments it is anticipated that the housing will have six plastic sides with one removable face or a separation split in the four side walls to allow access to the battery and internal components. Alternatively, the housing has five plastic sides with an open front covered by the cleaning cloth attachment. Removal of the cleaning cloth allows access to the internal components; however, with the cloth in place, the user is shielded from the rotating support disc and magnets during operation.

Figure 3:
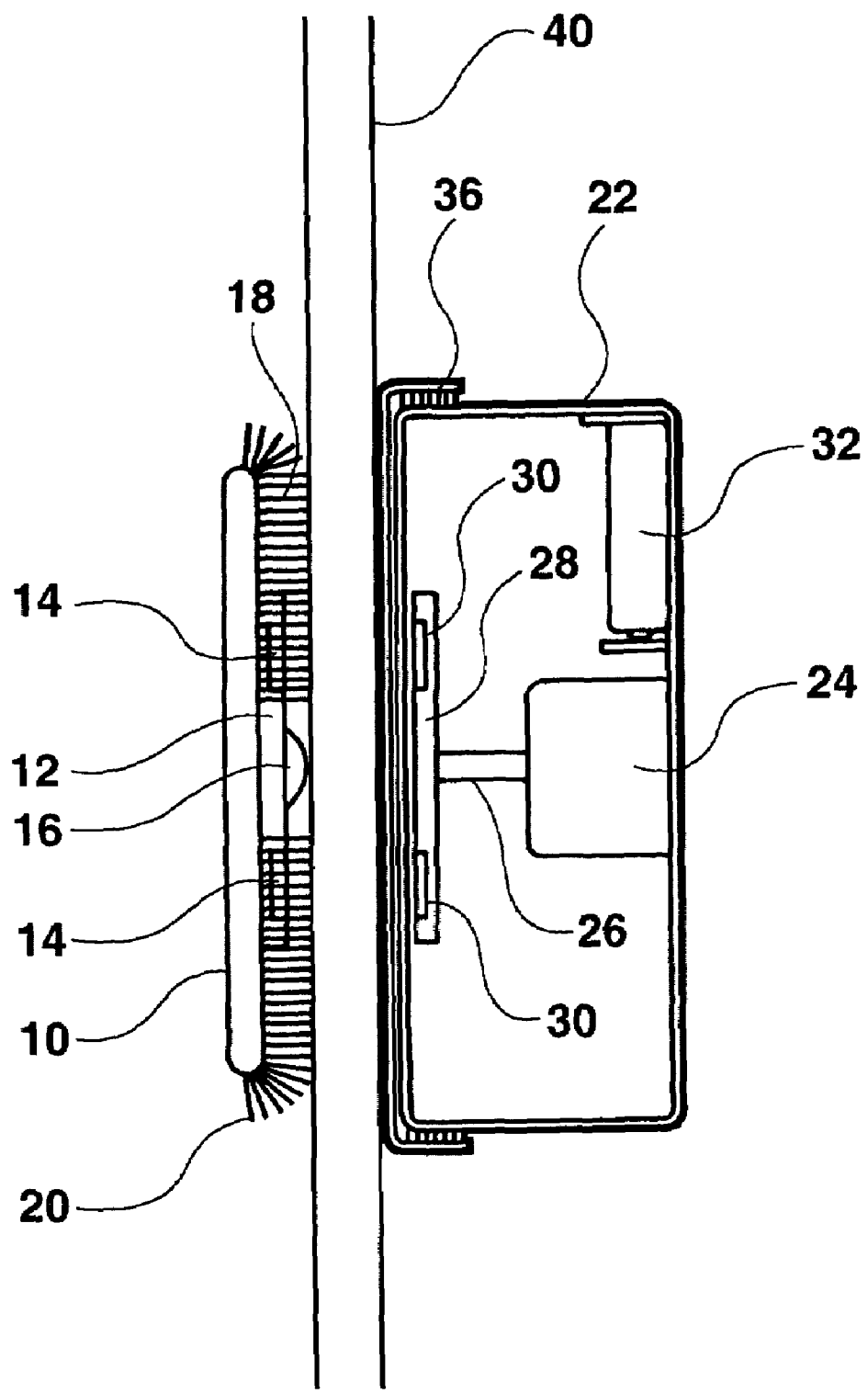
FIG. 3 is a side view of the inner cleaning and outer actuation components of the invention operably engaged to the surfaces of a glass plate such as an aquarium wall.

FIG. 3 shows the inner and outer components engaging a glass wall as anticipated in operation. The outer housing is placed against the glass 40 with the cleaning cloth against the surface. With the housing in this position, the second support disc is placed parallel to the surface of the glass. The brushes of the inner component are placed against in inner surface of the glass with the first support disc oppositely adjacent the second support disc allowing magnetic attraction between the magnets 14 and magnets 30 to maintain the position of the inner component. Operation of the motor causes the second support disc to spin parallel to and within several millimeters of the glass surface which induces the inner component to spin by magnetic force. The nub 16 resting on the surface of the glass provides a contact point for axial rotation of the body and first support disc. This rotation causes the brushes contacting the face of the glass to rotate, scouring the glass of algae and other contaminants. Movement of the housing along the external surface of the glass causes the body and first support disc to follow allowing the entire inner surface of the glass to be cleaned efficiently and thoroughly by moving the housing over the entire outer surface.

For the embodiment shown, the body 10 is resiliently flexible to allow the inner component to traverse over curved surfaces on the glass while being urged against the glass by the magnetic force imposed by the magnets in the first and second support discs.

Figure 4A:
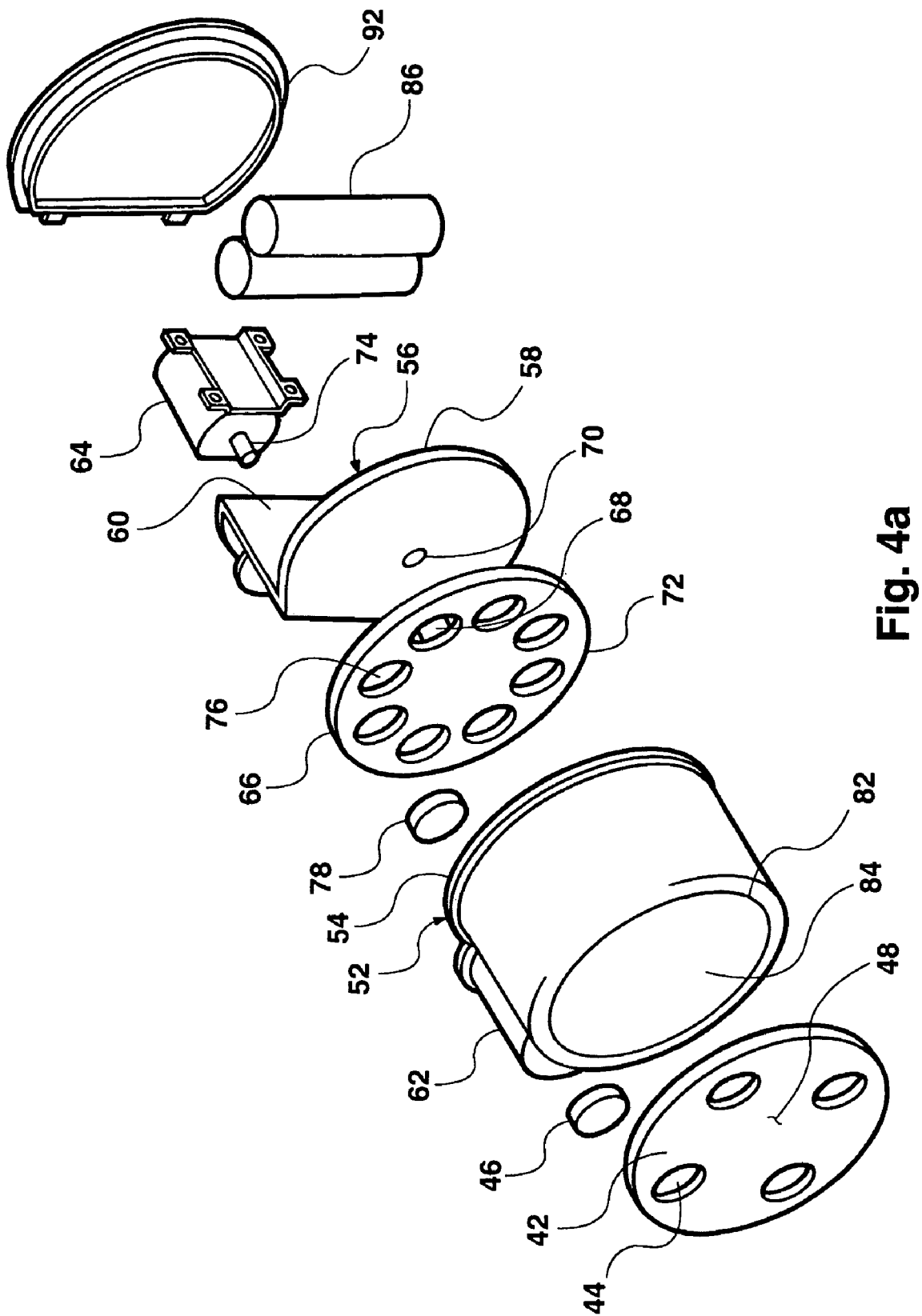
FIG. 4a is an exploded view of the components of a second embodiment of the outer actuation component of the invention employing a circumferential gear arrangement.

A second embodiment of the invention is shown in FIG. 4a. The cleaning component of this embodiment comprises a unitary reticulated foam disc 42 having multiple apertures 44. Magnetic elements 46 are carried in a geometrically spaced arrangement in the apertures. For the embodiment shown, four magnets are employed spaced at 90 degrees. A reticulated surface 48 of the foam disc provides a mildly abrasive cleaning surface for engagement of the glass surface to be cleaned. Exemplary materials for the disc in various embodiments include molded vinyl, Neoprene foam, Polyethylene foam, and Polyurethane foam.

The actuation component of the embodiment of FIG. 4 incorporates a molded plastic case 52 that has a substantially cylindrical body portion 54 which carries a support bracket 56. The support bracket incorporates a semi-circular element 58 which is closely received within the body portion of the case and a motor mount 60 extending substantially perpendicularly from the semi-circular element. A semi-cylindrical blister 62 extends from the body portion of the case to receive a motor 64 carried by the motor mount. A magnet wheel 66 having an axle 68 is supported by a bearing 70 at the center of the semi-circular element of the support bracket. The circumference of the magnet wheel incorporates gear teeth 72 for engagement of a pinion gear 74 on the motor. The magnet wheel also has multiple apertures 76. Magnets 78 are carried in the apertures in geometrically spaced arrangement. For the exemplary embodiment, four magnets are placed in the apertures in 90 degree offset complementary to the magnetic elements in the foam disc.

Figure 5A:
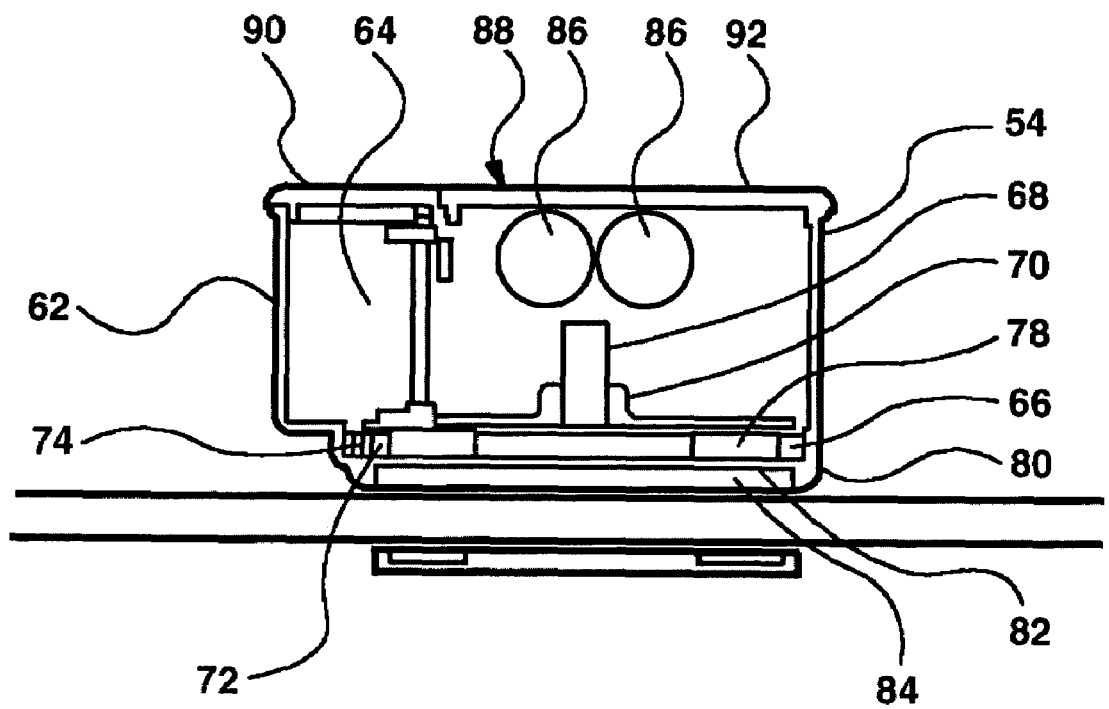
FIG. 5a is a side section view of inner cleaning and outer actuation components of the embodiment disclosed in FIG. 4a operably engaged to the surfaces of a glass plate.

As best seen in FIG. 5a, the magnet wheel is supported by the bracket immediately adjacent a front face 80 of the case. For the embodiment shown, the front face incorporates a relief or pocket 82 which accommodates a pad 84 for cleaning the opposite surface of the glass from the cleaning component. Batteries 86 are carried within the case to power the motor. A cover 88 closes the case. For the embodiment shown, the cover incorporates a first element 90 covering the motor blister and a portion of the case semi-cylinder and a second removable element 92 for access to the batteries mounted in the case.

Figure 4B:
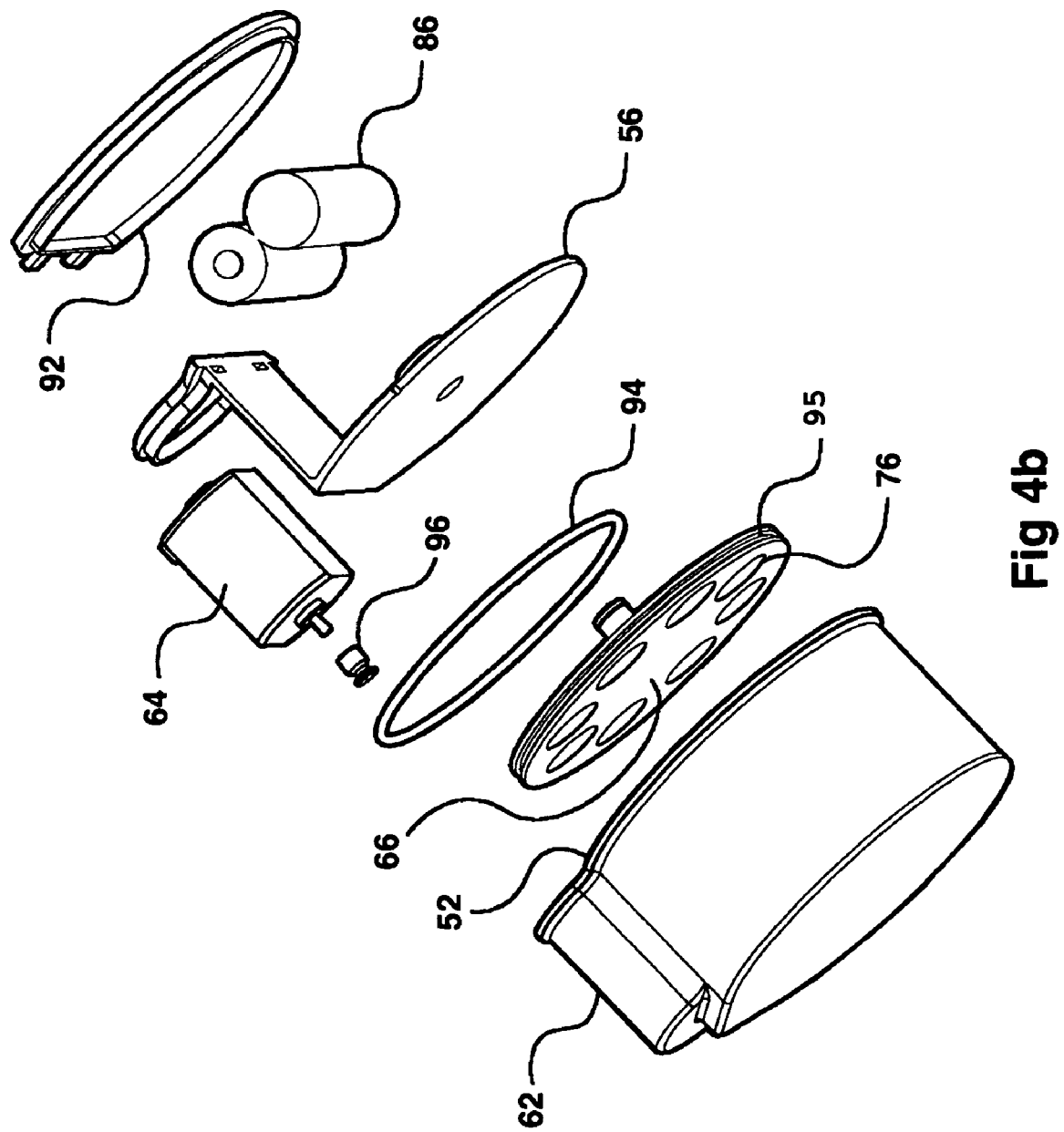
FIG. 4b is an exploded view of the components of a third embodiment of the outer actuation component of the invention employing a belt drive arrangement.
Figure 5B:
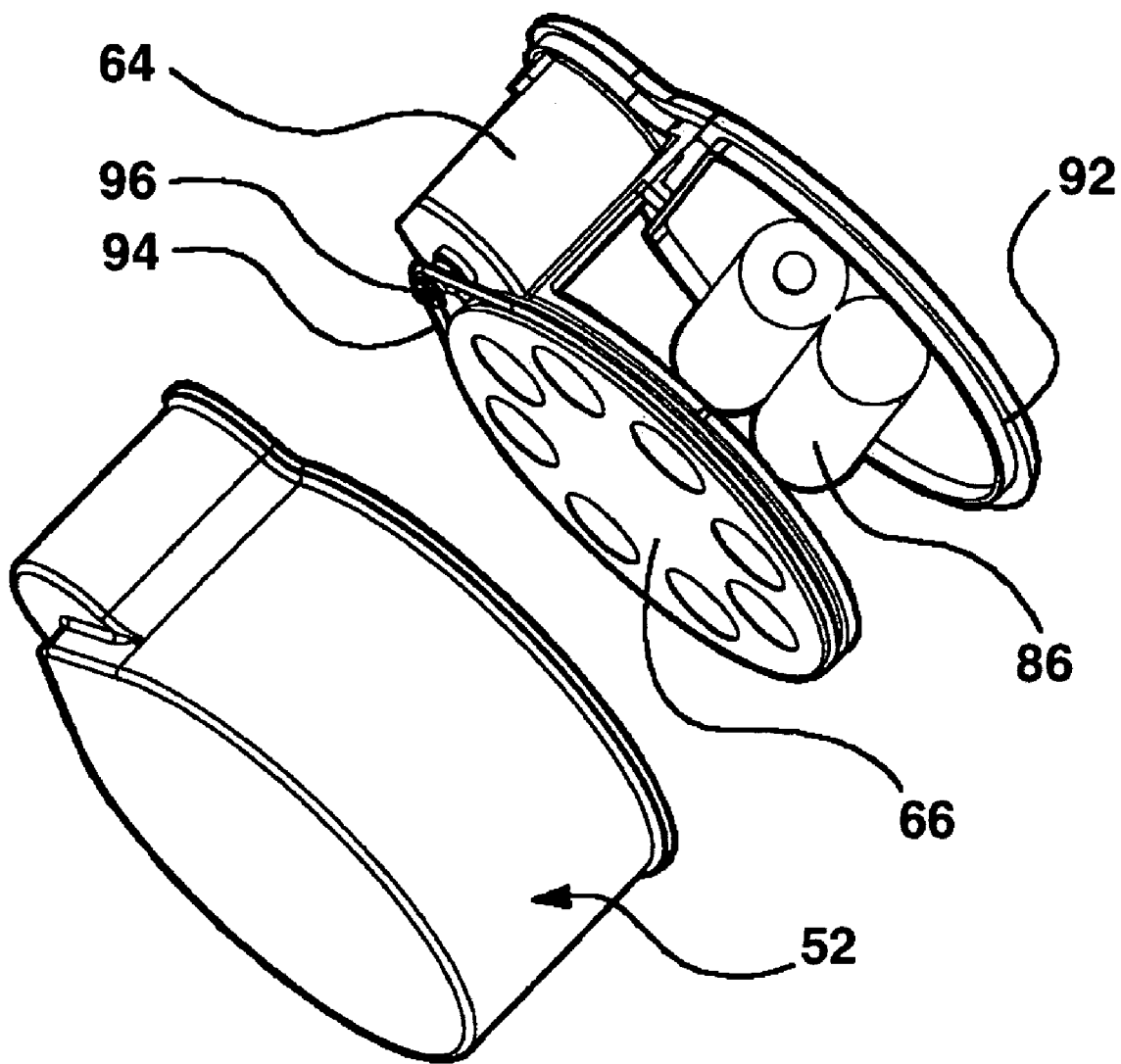
FIG. 5b is an isometric view of the actuation components of the embodiment disclosed in FIG. 4b as assembled with the cover shown removed.

In FIG. 4b, another embodiment of the outer actuation component is shown which has substantially similar components to the embodiment of FIG. 4a, however, the drive for the magnet wheel incorporates a belt 94 received around a circumferential grove 95 in the periphery of the magnet wheel and engaging a drive spool 96 received on the axle of the motor. An assembled view of the embodiment of FIG. 4b is shown in FIG. 5b with the case removed to show the internal components.

Figure 7:
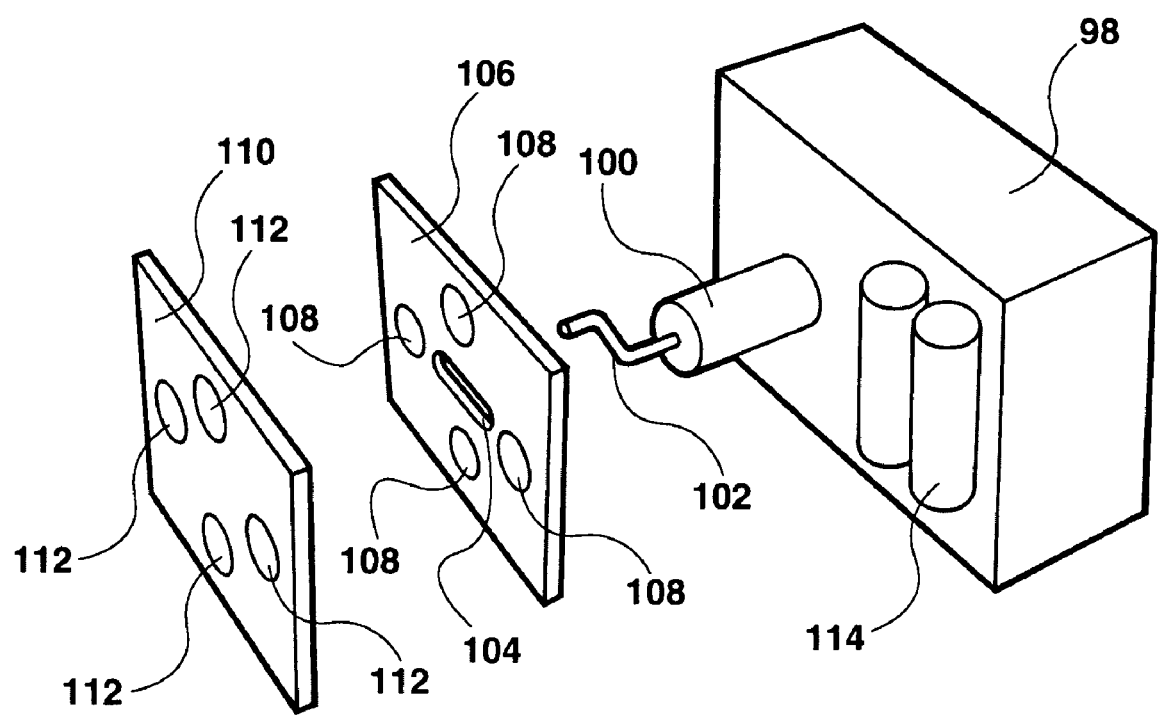
FIG. 7 is an exploded view of the components of a fourth embodiment of the invention with alternative motion.

Another alternative embodiment of the invention is shown in FIG. 7 which employs and alternative motion to the circular motion of the prior described embodiments. The actuation component has a case 98 carrying a motor 100 having an eccentric axle 102 received in a slot 104 in the magnet support element 106, which for the embodiment shown is rectangular in shape and carries magnets 108. Rotation of the motor drives the eccentric axle causing orbital reciprocating motion in the magnetic support element. Motion of the magnets in the magnetic support element induces complementary motion in the cleaning component comprising a rectangular foam pad 110 which carries magnets 112. Batteries 114 are carried in the case to power the motor. The oscillatory reciprocating motion also effectively cleans the surface of the glass intermediate the cleaning component and the actuation component as described for the rotational motion in the prior embodiments.

Figure 2C:
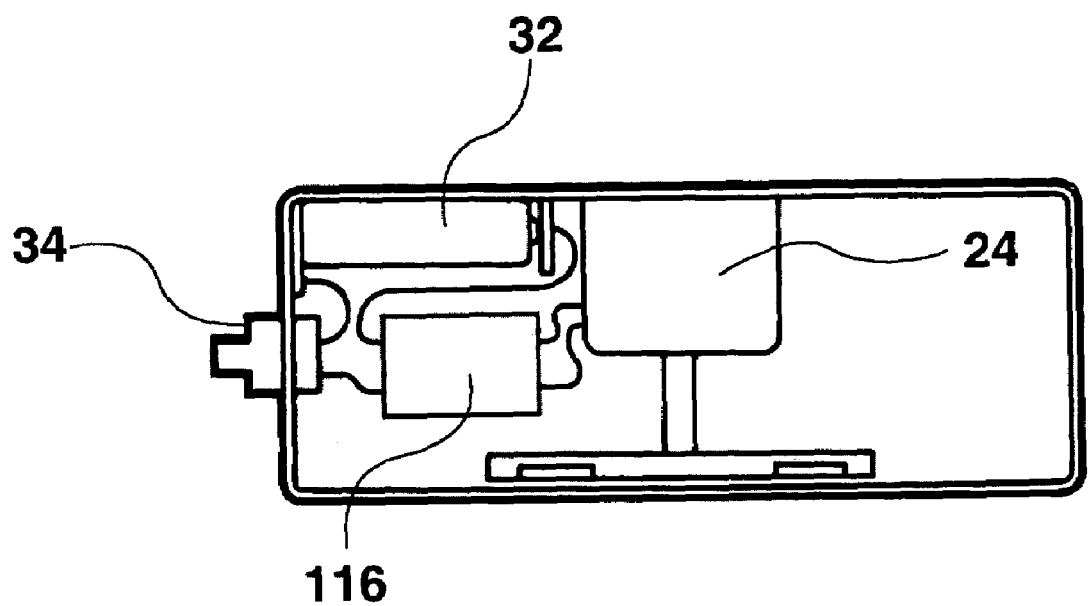
FIG. 2c is a side section view of the outer actuation component with the addition of a reversing circuit for the motor.
Figure 6:
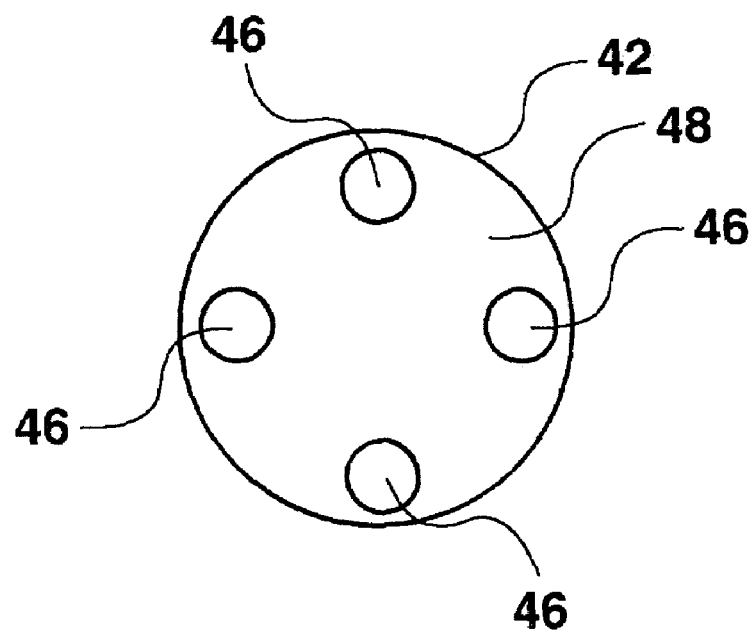
FIG. 6 is a front view of the inner cleaning component of the embodiment disclosed in FIG. 4.

An additional alternative for motion control is shown in FIG. 2c wherein a reversing circuit 116 cyclically reverses the motor direction to drive oscillating clockwise and counter-clockwise rotation of the magnetic support element to induce comparable oscillating motion of the cleaning element.

Figure 8A:
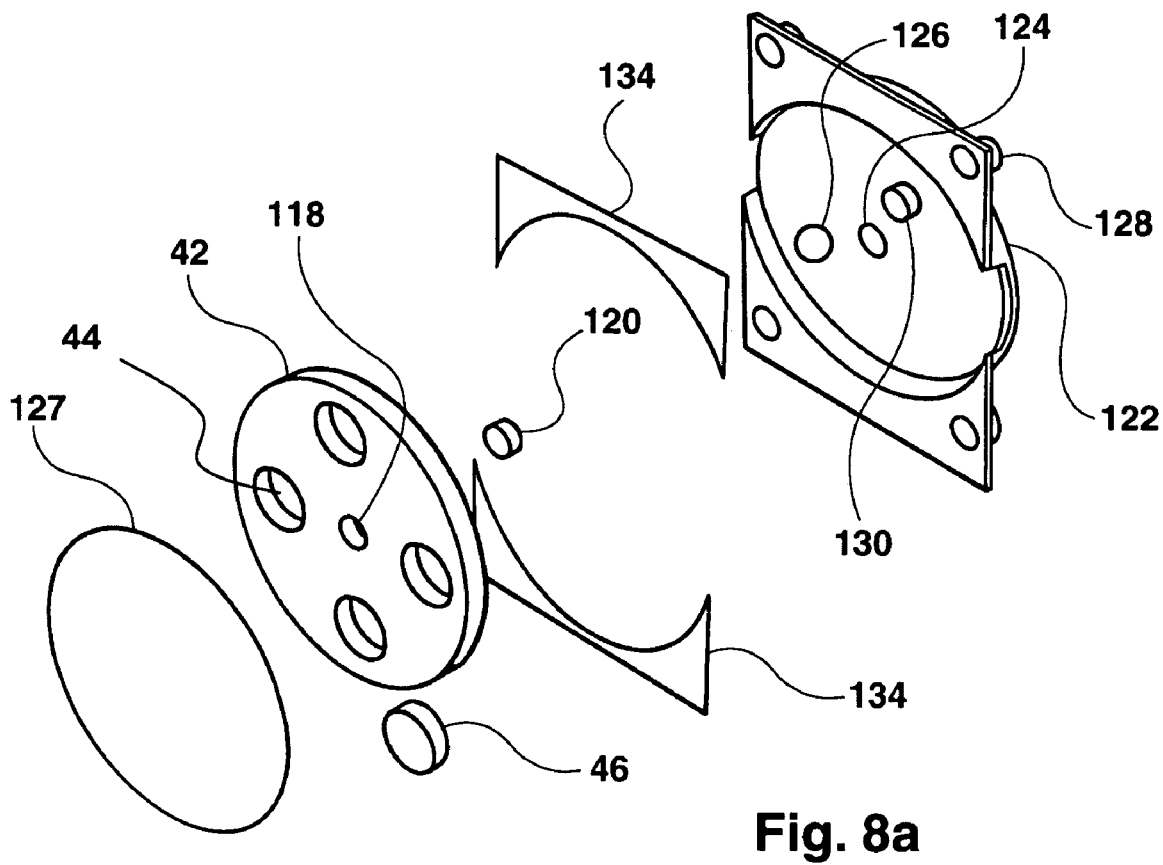
FIG. 8a is an exploded view of a first alternative embodiment of the inner cleaning component of the invention.

Cleaning of the interior surface of the glass is further facilitated by additional features as shown in the embodiment of the inner cleaning component shown in FIG. 8a. The foam disc, in addition to the apertures 44 which hold drive magnets 46, a central aperture 118 holds a pivot magnet 120. The foam disc rotates within a molded sleeve 122 which incorporates a relief 124 sized to receive a sphere magnet 126 which attracts and centers the pivot magnet and on which the pivot magnet rotates. The tangential interface between the sphere magnet and pivot magnet provides a very low friction rotation point. For embodiments in which additional cleaning capability beyond the capability of the reticulated foam, an abrasive circle 127 is glued to the face of the foam disc. In one exemplary embodiment, the abrasive circle is fabricated from the hook moiety of a standard hook and pile fastener such as Velcro™. An alternative embodiment employs a crushed walnut scrubber.

Additionally, the sleeve incorporates cavities 128 which hold corner magnets 130. For the embodiment shown in FIGS. 8a and 8b, the sleeve is rectangular with cavities and corner magnets proximate each of the four corners. For use of the invention in an aquarium cleaning capacity, the bottom edge 132 of the sleeve incorporates a sand guard which, during operation, slides into the sand to reach the edge of the aquarium bottom thereby preventing the spinning foam disc from being dragged into or becoming mired in the sand (or kicking up sand). The lower edge is tapered to scrape the algae at the sand/gravel line and acts as a wedge to advance the cleaning component into the corners. Inserts 134 of abrasive similar to that on the face of the foam disc are provided to create a squared cleaning surface that, while not rotating, does assist in cleaning the corners of the aquarium during operation. In yet a further operational feature, the upper portion of the sleeve incorporates a bubble or buoyancy cavity 136 sealed by the inserts that provides orienting buoyancy for the inner component maintaining its orientation in aquarium when the outer actuating component is not in proximity for magnetic attraction.

Figure 9A:
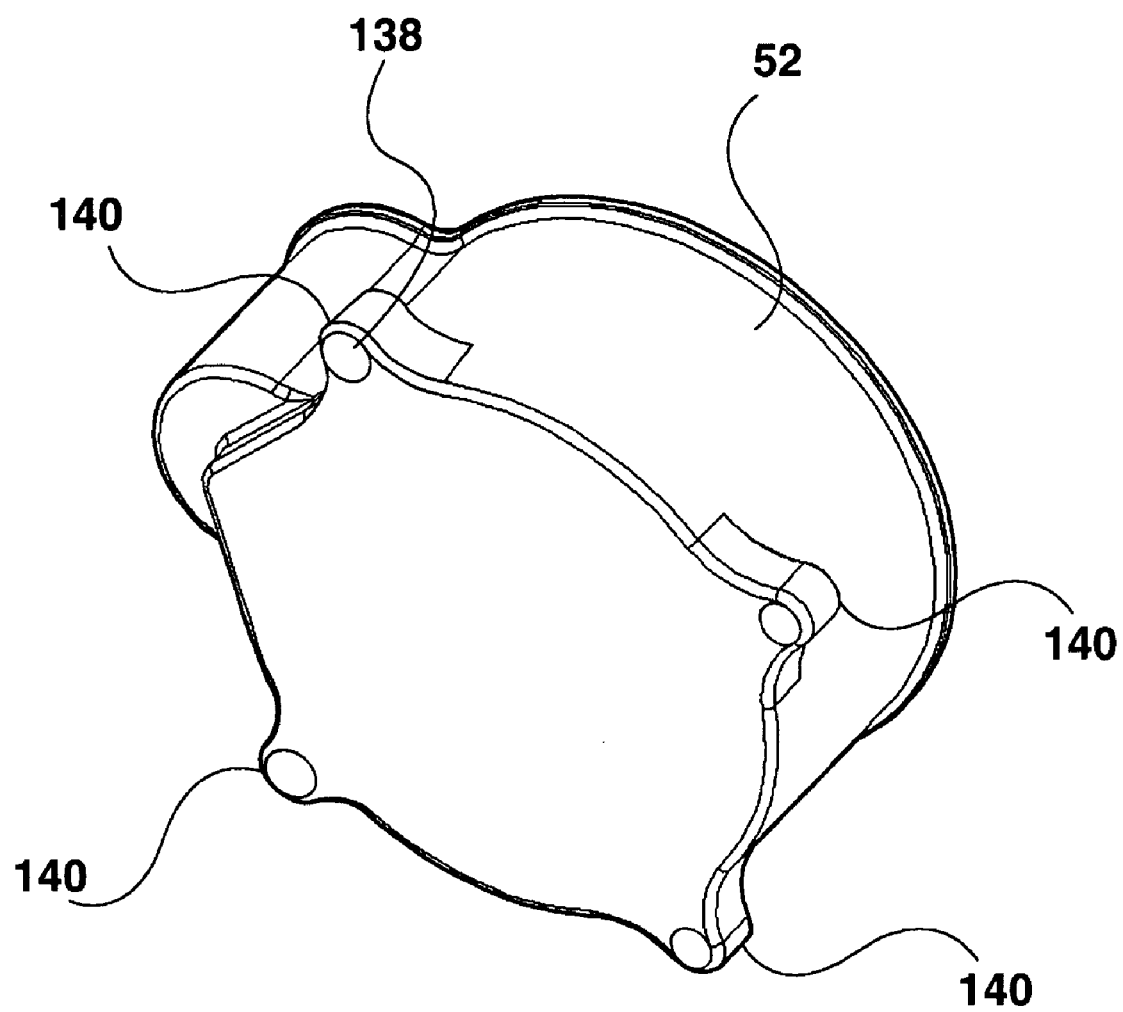
FIG. 9a is an isometric view of the interfacing case of the outer actuation component for use with the inner cleaning component of FIG. 8a; and, FIG. 9b is an isometric view of the interfacing case of the outer actuation component for use with the inner cleaning component of the embodiment shown in FIG. 8c.

As shown in FIG. 9a, the corner magnets of the sleeve described above are magnetically engaged by four corner magnets 138 constrained in cavities 140 molded in or extending from the case of the outer actuation component. The presence of the corner magnets further increases the pressure of the rotating foam disc on the glass surface to enhance cleaning. To further encourage the correct relative positioning of the inner and outer components, the polarity of the corner magnets is reversed from the polarity of the drive magnets.

Figure 8B:
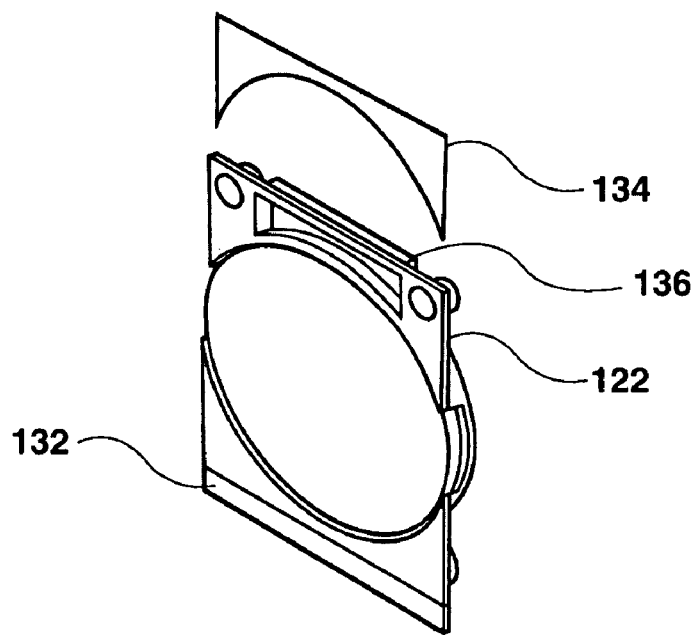
FIG. 8b is a view of the embodiment of FIG. 8a substantially assembled.
Figure 8C:
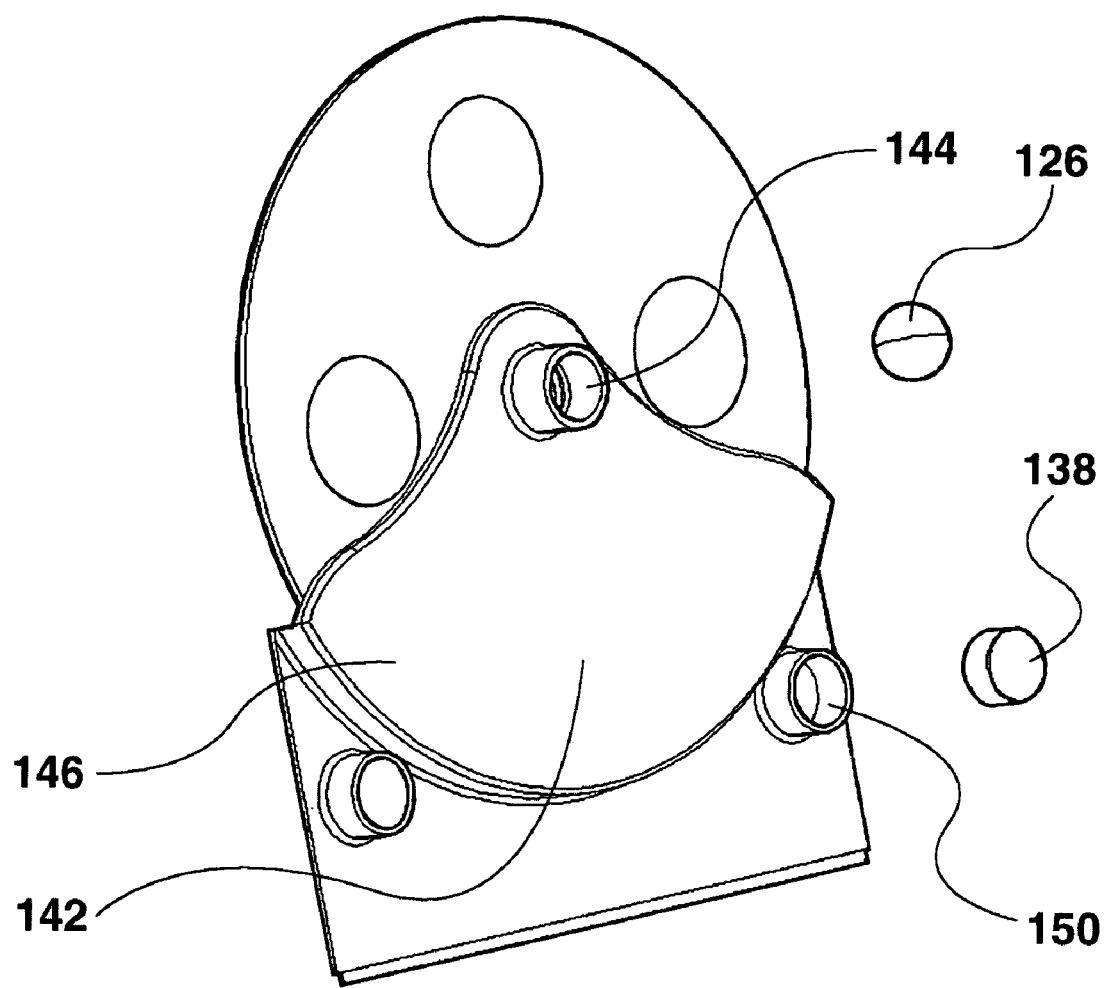
FIG. 8c is a rear isometric view of a second alternative embodiment of the inner cleaning component of the invention.

FIG. 8c shows a modification of the embodiment of FIG. 8b wherein the sleeve is truncated to provide only an arc segment 142 interfacing with the foam disc. The sphere magnet 126 is retained in a snap fit engagement 144 provided on a tongue 146 at the apex of the arc segment. The snap fit engagement provides a loose fit at the circumference of the sphere allowing the spherical magnet to float in the seat for self orientation with the pivot magnet. Two lower corner magnets 138 are constrained in corner reliefs and the bottom edge of the component provides the sand guard. Choice of the materials for the sleeve, disc and sand guard, greater buoyancy provided by the disc allows the loose orientation of the sleeve with the sand guard down.

Figure 8D:
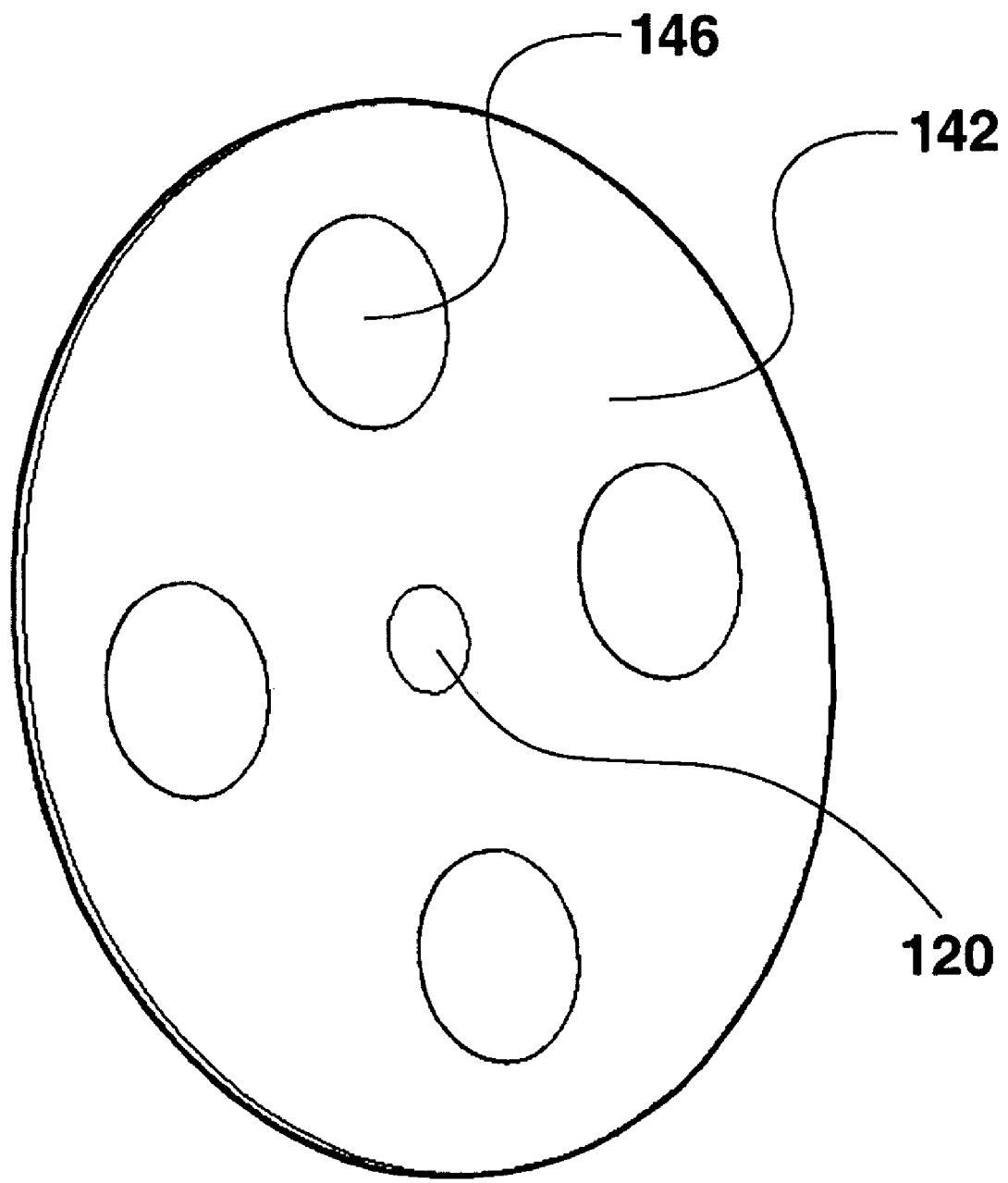
FIG. 8d is a front view of the cleaning element usable with the inner cleaning component embodiments of FIGS. 8a and 8c.

FIG. 8d shows the assembled configuration of the foam disc for the inner component embodiments shown in FIGS. 8a, b and c.

Figure 9B:
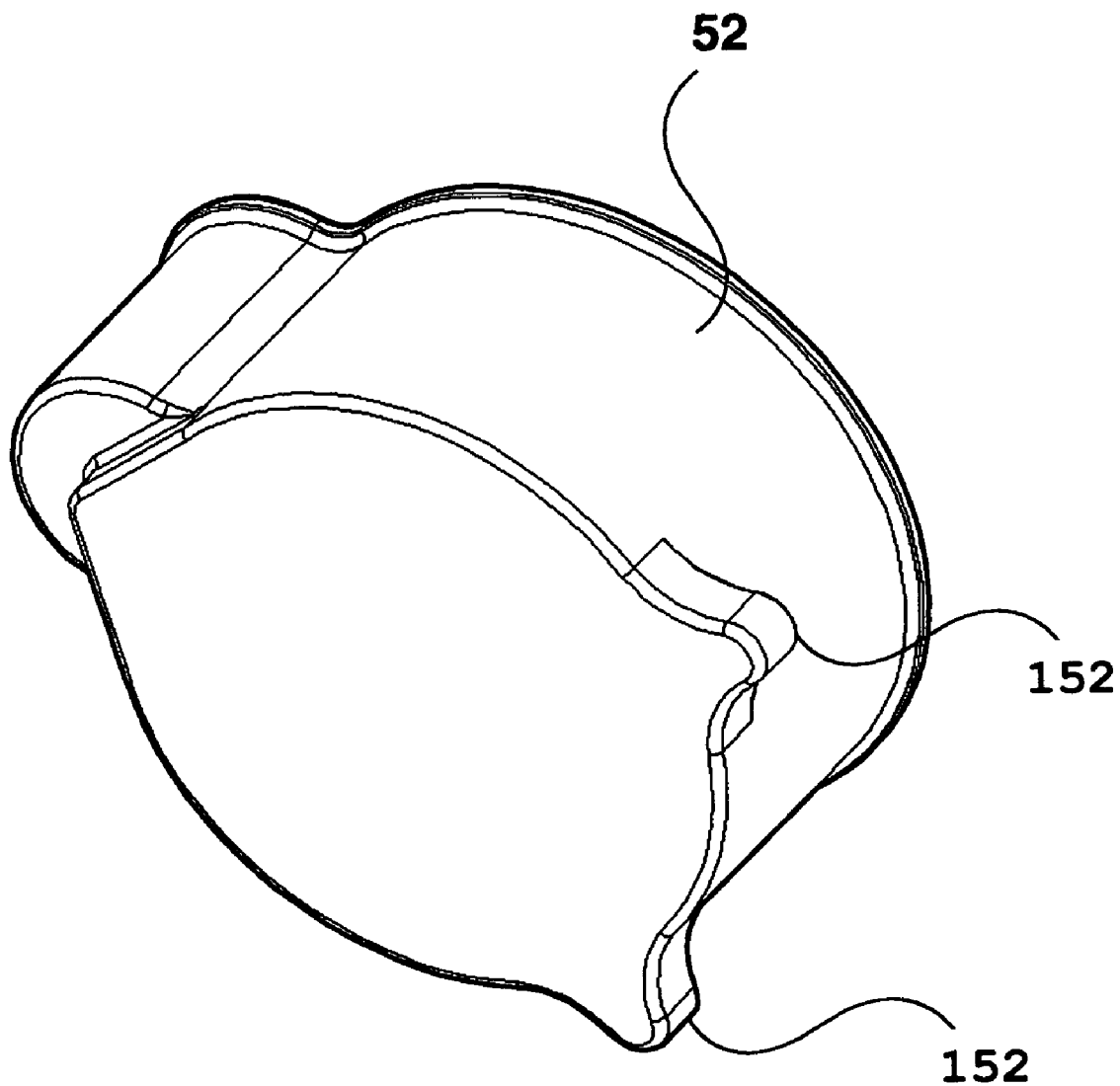

As previously described with respect to FIG. 9a, FIG. 9b incorporates elements in the outer actuation component case to engage the truncated sleeve of the inner cleaning component. The case incorporates two ears 152 which contain mating corner magnets for the two corner magnets of the sleeve. As with the previous embodiment, use of opposite polarity on the corner magnets from the drive magnets allows enhanced orientation of the inner and outer components for operation.

Those skilled in the magnetic art will recognize that replacement of the multiple magnets shown in the embodiments herein with unitary multipole devices provides an alternative magnetic coupling and drive embodiment within the scope of the invention disclosed. Further, while permanent magnets are shown for the magnetic elements in the cleaning and actuating components, electromagnetic elements are employed in alternative embodiments.

The embodiments disclosed in this detailed description have been directed to use as an aquarium cleaning device. However, devices constructed in accordance with the present invention are applicable for use in cleaning the exterior surface of building windows or other magnetically permeable surfaces which are difficult or dangerous to clean but have easy access from an opposite surface.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A surface cleaning device comprising:
    a cleaning component for placement on a first surface to be cleaned and having
        magnetic elements carried therein and,
        means for cleaning the surface;
    an actuating component for placement adjacent the cleaning component on a second surface opposite from the first surface and having a support means containing an actuator with complementary magnetic elements to the magnetic elements of the cleaning component for attraction thereof through the first and second surface, a motor operably attached to the actuator for inducing motion of the actuator, the motion of the actuator urging complementary motion of the cleaning component through magnetic attraction of the magnetic elements and complementary magnetic elements wherein the motor has a drive means and the actuator comprises a disc and means for engaging a circumference of the disc for mating to the drive means to rotate the actuator; and, means for powering the motor.

2. A surface cleaning device as defined in claim 1 wherein the cleaning component comprises a unitary foam disc having a plurality of apertures radially spaced about an axis, the apertures sized to closely receive the magnetic elements, the foam disc having a first surface for engaging the surface as the means for cleaning the surface.

3. A surface cleaning device as defined in claim 2 wherein the means for cleaning the surface comprises an abrasive surface on the disc.

4. A surface cleaning device as defined in claim 1 wherein the cleaning component comprises a substantially circular body incorporating means for carrying the magnetic elements and having a plurality of brushes extending from a first surface for engaging the surface as the means for cleaning the surface.

5. A surface cleaning device as defined in claim 1 wherein the motor is a DC motor and the means for powering the motor comprises:

a battery; and a switch for connecting the battery to the motor.

6. A surface cleaning device as defined in claim 5 wherein the switch is a spring loaded contact switch.

7. A surface cleaning device defined in claim 1 wherein the motor drive means is a pinion gear and the means for engaging the circumference comprises gear teeth on the circumference of the disc for mating to the pinion gear to rotate the actuator.

8. A surface cleaning device as defined in claim 7 further comprising a reversing circuit connected to the motor.

9. A surface cleaning device as defined in claim 1 further comprising a reversing circuit connected to the motor.

10. A surface cleaning device as defined in claim 1 wherein the actuating component incorporates means for cleaning the opposite surface.

11. A surface cleaning device as defined in claim 1 wherein the cleaning component comprises a sleeve having means for rotational support of a disc and wherein the magnetic elements are housed within the disc.

12. A surface cleaning device as defined in claim 11 wherein the sleeve is adapted for use in water and further incorporates integral buoyancy means for orienting the sleeve.

13. A surface cleaning device as defined in claim 11 wherein the sleeve further incorporates a sand guard depending from a main body of the sleeve for use of the invention in an aquarium cleaning capacity to space the disc from contact with a sand bottom.

14. A surface cleaning device as defined in claim 1 wherein the motor drive means comprises a spool and the engaging means comprises a belt received in a groove on the circumference of the disc causing rotational motion of the disc.

15. A surface cleaning device comprising:

a cleaning component for placement on a first surface to be cleaned and having magnetic elements carried therein and, means for cleaning the surface;

an actuating component for placement adjacent the cleaning component on a second surface opposite from the first surface and having a support means containing an actuator with complementary magnetic elements to the magnetic elements of the cleaning component for attraction thereof through the first and second surface, a motor operably attached to the actuator for inducing motion of the actuator, the motion of the actuator urging complementary motion of the cleaning component through magnetic attraction of the magnetic elements and complementary magnetic elements wherein the motor has an eccentric drive axle and the actuator is mounted to the drive axle causing oscillatory reciprocating motion of the actuator; and, means for powering the motor.

16. A surface cleaning device comprising:

a cleaning component for placement on a first surface to be cleaned and having a sleeve including means for rotational support of a disc, magnetic elements carried within the disc and, means on the disc for cleaning the surface, wherein the means for rotation support comprises a magnetic sphere constrained at a rotation point on the sleeve;

an actuating component for placement adjacent the cleaning component on a second surface opposite from the first surface and having a support means containing an actuator with complementary magnetic elements to the magnetic elements of the cleaning component for attraction thereof through the first and second surface, a motor operably attached to the actuator for inducing motion of the actuator, the motion of the actuator urging complementary motion of the cleaning component through magnetic attraction of the magnetic elements and complementary magnetic elements; and, means for powering the motor.

17. A surface cleaning device as defined in claim 16 wherein the sleeve further incorporates corner magnets and the actuating component further incorporates complementary corner magnets for attraction of the corner magnets of the sleeve.

18. A surface cleaning device as defined in claim 17 wherein the corner magnets are of opposite polarity to the magnetic elements housed within the disc.

19. A surface cleaning device comprising:

a cleaning component for placement on a first surface to be cleaned and having a sleeve incorporating a magnetic sphere at a rotation point and a plurality of corner magnets, a cleaning disc having central aperture carrying a centering magnet attracted to and rotating on the magnetic sphere and further carrying a plurality of radially spaced magnetic elements, the disc having an abrasive surface element adjacent the first surface;

an actuating component for placement on a second surface opposite from the first surface adjacent the cleaning component and having a support means containing an actuation disc with complementary magnetic elements to the magnetic elements mounted in the cleaning disc for attraction thereof through the first and second surface, a DC motor attached to the actuation disc by a circumferential belt drive for inducing rotation of the actuation disc, the motion of the actuation disc urging complementary motion of the cleaning disc through magnetic attraction of the magnetic elements and complementary magnetic elements, a plurality of mating corner magnets of complimentary polarity to the corner magnets on the sleeve and supported by the support means in complementary spaced relation to the corner magnets on the sleeve for attraction thereof through the surface, the polarity of the corner magnets and mating corner magnets opposite to the magnetic elements and complementary magnetic elements respectively;

batteries carried by the support means for powering the motor; and, a switch for activating the motor.

* * * * *